United States Patent
Horii et al.

(10) Patent No.: US 8,930,677 B2
(45) Date of Patent: *Jan. 6, 2015

(54) COMPUTER OPERATION CONTROL METHOD, PROGRAM, AND SYSTEM

(75) Inventors: Hiroshi Horii, Kanagawa-ken (JP); Kiyokuni Kawachiya, Kanagawa-ken (JP); Tamiya Onodera, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 15 days.

This patent is subject to a terminal disclaimer.

(21) Appl. No.: 13/594,005

(22) Filed: Aug. 24, 2012

(65) Prior Publication Data
US 2012/0324206 A1    Dec. 20, 2012

Related U.S. Application Data (63) Continuation of application No. 13/347,905, filed on Jan. 11, 2012.

(30) Foreign Application Priority Data

Jan. 20, 2011   (JP) .................... 2011-009968

(51) Int. Cl.
  *G06F 9/312*   (2006.01)
  *G06F 9/52*    (2006.01)
(52) U.S. Cl.
  CPC ..................... *G06F 9/52* (2013.01)
  USPC .......................... 712/202; 712/205
(58) Field of Classification Search
  None
  See application file for complete search history.

(56) References Cited

U.S. PATENT DOCUMENTS 7,117,318 B1 *  10/2006  Tene et al. ............. 711/154

FOREIGN PATENT DOCUMENTS

| JP | 200315876 A | 1/2003 |
| JP | 2003216442 A | 7/2003 |
| JP | 2008033932 A | 2/2008 |

OTHER PUBLICATIONS

Kotzmann et al., "Escape Analysis in the context of Dynamic Compilation and Deoptimization" published 2005 (https://www.usenix.org/legacy/events/vee05/full_papers/p111-kotzmann.pdf).*
Lea, "A Java fork/join framework," Java Grande Conference archive, Proceedings of the ACM 2000 conference on Java Grande table of contents, pp. 36-43, 2000.

(Continued)

*Primary Examiner* — Don Wong
*Assistant Examiner* — Deric Ortiz
(74) *Attorney, Agent, or Firm* — Cantor Colburn LLP (57) ABSTRACT

A computer implemented control method, article of manufacture, and computer implemented system for determining whether stack allocation is possible. The method includes: allocating an object created by a method frame to a stack. The allocation is performed in response to: calling a first and second instruction in the method frame; the first instruction causes an escape of the object, and the second instruction cancels the escape of the object; the object does not escape to a thread other than a thread to which the object has escaped, at the point in time when the escape is cancelled; the first instruction has been called before the second instruction is called; and the object does not escape in accordance with an instruction other than the first instruction in the method frame, regardless of whether the object escapes in accordance with the first instruction.

6 Claims, 9 Drawing Sheets

(56) References Cited

OTHER PUBLICATIONS

Choi, et al., "Escape analysis for Java," Proceeding OOPSLA '99 Proceedings of the 14th ACM SIGPLAN conference on Object-oriented programming, systems, languages, and applications, ACM SIGPLAN Notices Homepage archive vol. 34 Issue 10, Oct. 1999 (http://portal.acm.org/citation.cfm?id=320386).

Corry, "Optimistic stack allocation for java-like languages," Proceeding ISMM '06 Proceedings of the 5th international symposium on Memory management 2006.

Blanchet, "Escape analysis for Java: Theory and practice," ACM Transactions on Programming Languages and Systems, vol. 25, No. 6, Nov. 2003, pp. 713-775.

* cited by examiner

PRIOR ART

AN EMBODIMENT OF THE PRESENT INVENTION

COMPUTER OPERATION CONTROL METHOD, PROGRAM, AND SYSTEM

CROSS-REFERENCE TO RELATED APPLICATIONS

This application is a continuation of and claims priority from U.S. application Ser. No. 13/347,905 filed on Jan. 11, 2012, which in turn claims priority under 35 U.S.C. §119 to Japanese Patent Application No. 2011-009968 filed Jan. 20, 2011, the entire contents of both applications are incorporated herein by reference.

BACKGROUND OF THE INVENTION

1. Field of the Invention

The present invention relates to a technique where stack allocation is performed on the basis of the result of an escape analysis in a computer system.

2. Description of the Related Art

The process of allocating a task object not to a heap but to a stack on the basis of an escape analysis has been performed in computer systems. Specifically, by allocating an object not to a heap but to a stack if possible, the cost of garbage collection or heap allocation can be reduced.

JSR 166 of Java® 7 is provided with a Fork-Join framework proposed by Doug Lea. For the Fork-Join framework, see Doug Lea, "A Java fork/join framework," Java Grande Conference archive, Proceedings of the ACM 2000 conference on Java Grande table of contents, pages 36-43, 2000.

Specifically, the Fork-Join framework is a mechanism for creating an object for a task (task object) and realizing divide and conquer using fork( ) and join( ). That is, a task is recursively divided into subtasks until it becomes small enough to be solved using a simple and short sequential method.

Fork( ) is a function of starting a task. The thread for executing the task may be a thread other than the thread which has called the fork. Join( ) is a function of waiting for the completion of the forked task. Hereafter, a thread for executing a task will be referred to as a "worker."

In the implementation of Java® 7, a work stealing mechanism is used to implement the above-mentioned framework. Specifically, each worker is assigned a task queue specific to the worker. When starting the task of a task object created in a function using fork( ), the task object is temporarily put into the task queue of the worker which has executed fork( ). Here assume that the worker which has performed fork( ) on the task object waits for the completion of the task object using join( ), If any other worker has yet to process the task object; the worker processes the task object; if any other worker is processing it, the worker waits for the completion of the processing. Each worker, when completing the processing of the current task, extracts a task from the assigned task queue and starts processing it and, when completing the processing of all tasks in the task queue (idle state), extracts a task from the task queue of any other worker (steal) and processes it. For each worker to process a task contained in a task queue other than the assigned task queue is called "work stealing."

Shown below is an example of execution of a parallel execution program implementing work stealing.

```
class Fib extends ForkJoinTask {
   Integer r;
   Fib(int r) { this.r = r; 3333}
   protected boolean exec( ) {
     if (r < 2) return true;
```

```
     Fib f1 = new Fib(r – 1);
     Fib f2 = new Fib(r – 2);
     f1.fork( ); f2.fork( );
     f2.join( ); f1.join( );
     r = f1.r + f2.r;
     return true;
     }
   }
void main( ) {
   pool.invoke(new Fib(5));
}
```

The execution process of this program is as follows:

First, a task object (ForkJoinTask) is created using Fib f1=new Fib(r−1) and Fib f2=new Fib(r−2).

Second, a worker calls fork( ) of the task object using f1.fork( ) and f2.fork( ). The worker then inserts the task object into the task queue specific to the worker. If any other worker is idle, the task object is stolen from the queue by the idle worker.

Third, the worker which has called fork( ) calls join( ) of the task object using f2.join( ) and f1.join( ) and waits for the completion of the task. If the task object is not stolen, the worker which has called join( ) extracts the task object from the task queue specific to the worker and performs processing (exec( )) of the task. If the task object is stolen, the worker waits for the completion of the processing (exec( )) of the task object.

In this process, an attempt to realize fine-grained parallelism causes creation of a great number of task objects. Objects which are used only through the field of a task object are also created in a great number. This increases the cost of heap allocation of the task object and the associated garbage collection cost, increasing the runtime cost. To resolve this, the task object may be allocated to the stack. However, the task object is inserted into a queue on the heap in the fork( ) processing. Since the object on the heap can basically be referred to (escape) by other threads, an ordinary escape analysis does not determine that stack allocation is possible.

Japanese Unexamined Patent Application Publication No. 2003-15876 relates to a system and method that can allocate an object to a method call stack in a partial compilation environment and discloses a technique where when dynamically loading a class in Java®, an escape analysis is performed using only information on the loaded class.

Japanese Unexamined Patent Application Publication No. 2003-216442 includes a code conversion unit that generates machine language code on the basis of the source code of an execution program to be processed, an optimized range determination unit that, with respect to a method in the execution program based on this machine language code, determines a range where an object created in this method is not escaping, and a scalar replacement execution unit that performs scalar replacement within the range where the object is not escaping, and discloses a technique where targets to be subjected to an escape analysis are limited.

Japanese Unexamined Patent Application Publication No. 2008-33932 relates to an improved system for recompiling code in a NUMA computer system and discloses a technique where an object which is determined in an escape analysis to be possible to allocate to the stack is placed in an area which is locally accessible by NUMA.

However, these related art examples do not suggest or disclose an escaping object to be allocated to the stack.

Jong-Deok Choi, Manish Gupta, Mauricio Serrano, Vugranam C. Sreedhar, Sam Midkiff, "Escape analysis for Java," Proceeding OOPSLA '99 Proceedings of the 14th ACM SIGPLAN conference on Object-oriented programming, systems, languages, and applications, ACM SIGPLAN Notices Homepage archive Volume 34 Issue 10, October 1999 (http://portal.acm.org/citation.cfm?id=320386) describes a technique for performing stack allocation using an ordinary escape analysis. However, the technique described does not allocate an object accessed by multiple workers to the stack.

Erik Corry, "Optimistic stack allocation for java-like languages," Proceeding ISMM '06 Proceedings of the 5th international symposium on Memory management 2006 (http://portal.acm.org/citation.cfm?id=1133956.1133978) describes a technique where an object is speculatively allocated to the stack and, if the object is escaping at the point in time when the frame completes, the object is moved to the heap. However, the technology described moves an object to the heap at the point in time when the object becomes accessible by other workers, and thus move all task objects to the heap.

SUMMARY OF THE INVENTION

According to an aspect of the present invention, a computer implemented control method determines whether stack allocation is possible. The method includes: allocating, by a computer, an object created by a method frame to a stack. The allocation is performed in response to: calling a first instruction in the method frame and a second instruction in the method frame; the first instruction causes an escape of the object, and the second instruction cancels the escape of the object caused by the first instruction; the object does not escape to a thread other than a thread to which the object has escaped, at the point in time when the escape is cancelled; the first instruction has been called before the second instruction is called; and the object does not escape in accordance with an instruction other than the first instruction in the method frame, regardless of whether the object escapes in accordance with the first instruction.

According to another aspect of the present invention, an article of manufacture tangibly embodying computer readable instructions, which when implemented, causes a computer system to carry out the steps of the method of the present invention.

According to a further aspect of the present invention, a computer implemented system for determining whether stack allocation is possible. The system includes an allocation unit configured to allocate an object created by a method frame to a stack in response to: calling a first instruction in the method frame and a second instruction in the method frame, where: the first instruction causes an escape of the object, and the second instruction cancels the escape of the object caused by the first instruction; the object does not escape to a thread other than a thread to which the object has escaped, at the point in time when the escape is cancelled; the first instruction has been called before the second instruction is called; and the object does not escape in accordance with an instruction other than the first instruction in the method frame, regardless of whether the object escapes in accordance with the first instruction.

DETAILED DESCRIPTION OF THE PREFERRED EMBODIMENTS

Now, embodiments of the present invention will be described with reference to the accompanying drawings. It should be understood that the embodiments are intended to describe a preferred aspect of the present invention and that there is no intent to limit the scope of the present invention to what is described herein. Through the drawings below, the same reference signs are assigned to the same components unless otherwise specified.

The embodiments of the present invention provide a process of, when performing fork( ) or join( ) on a task object created in a Fork-Join framework, properly determining whether the task object can be allocated to the stack.

According to an embodiment of the present invention, a process of making the following determinations in a Fork-Join framework is implemented. In a process of inserting a task object into a work-stealing queue, the object is determined not to be escaping. This process is performed by, for example, fork( ). In a process of waiting for the completion of the task object inserted into the queue, the object is determined not to be escaping. This process is performed by, for example, join( ). In processes other than the above-mentioned ones, the task object is determined not to be escaping.

Further, in a process according to an embodiment of the present invention, whether a task object is escaping is determined during the execution of the task object. If, in the frame that has created the task object which is determined in this analysis not to escape, a process of waiting for the completion of the task object is always performed after a process of inserting the task object into a work-stealing queue, the task object is placed in the stack.

When the task object is escaping during execution of a fork method or during execution of a join method, it can be ensured that other workers do not access the task object when the join process completes. As a supplemental description, the join( ) process on the task object completes when any worker completes the task of the task object. In other words, if the task object is not escaping when any worker is processing of the task of the task object, the task object does not escape after the join( ) process. That is, although it has been believed that the task object cannot be allocated to the stack under this condition, it can be determined that the task object can safely be allocated to the stack.

The embodiments of the present invention allow for safely allocating the task object to the stack when the task object cannot be allocated, through conventional techniques, to the stack. This reduces the cost of garbage collection or that of heap allocation of the object, which can increase the processing speed of the computer system.

Figure 1:
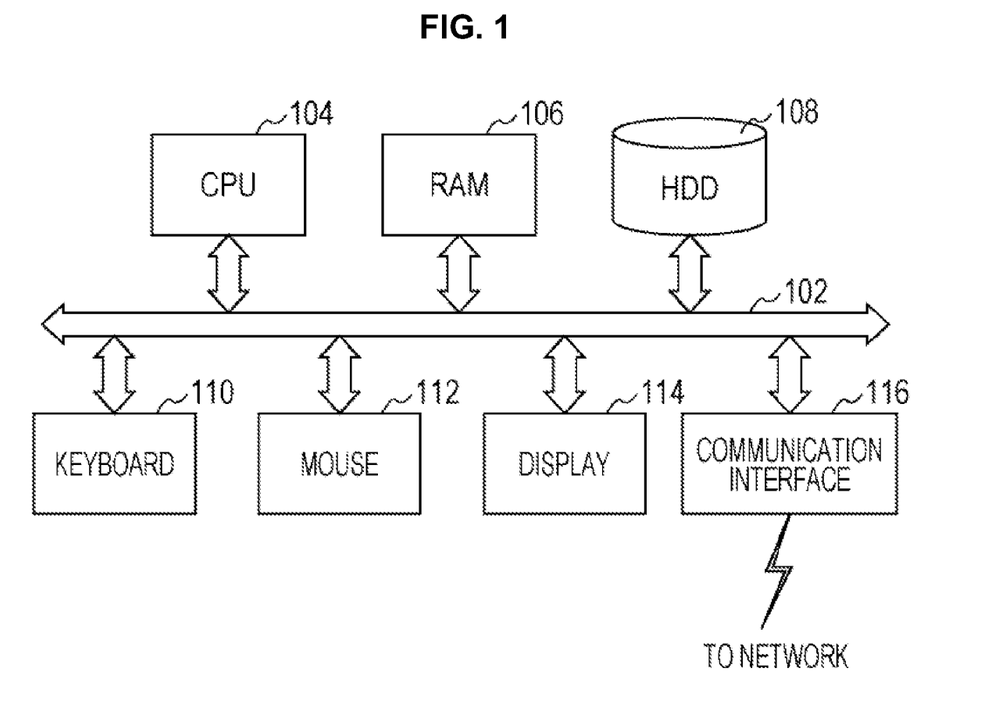
FIG. 1 is a block diagram showing an example of hardware according to an embodiment of the present invention.

Referring to FIG. 1, a block diagram shows computer hardware for a system configuration and processes according to this embodiment. In FIG. 1, a CPU 104, a main memory (RAM) 106, a hard disk drive (HDD) 108, a keyboard 110, a mouse 112, and a display 114 are connected to a system bus 102. The CPU 104 is preferably based on a 32-bit or 64-bit architecture and may be, for example, Pentium™ 4 available from Intel Corporation, Core™ 2 DUO available from Intel Corporation, Xeon™, or Athlon™ available from Advanced Micro Devices, Inc. The main memory 106 has a capacity preferably not less than 2 GB, more preferably not less than 4 GB.

An operating system 202 (FIG. 2) is stored on the hard disk drive 108. The operating system may be of a type suitable for the CPU 104, such as Linux™, Windows™ 7, Windows XP™, or Windows™ 2003 server available from Microsoft Corporation, or Mac OS™ available from Apple Inc.

Figure 2:
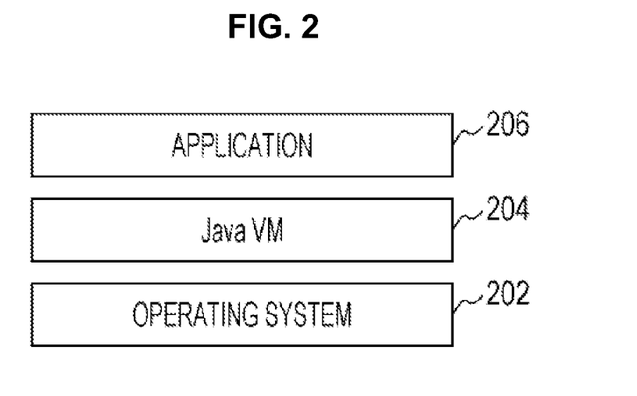
FIG. 2 is a diagram showing the layers of function blocks of the processing environment according to an embodiment of the present invention.

Also stored on the hard disk drive 108 is a program for causing the system to operate as a Web server, preferably such as Apache. This program is loaded into the main memory 106 when the system is started. Also stored on the hard disk drive 108 is a Java® Runtime Environment program for a Java® virtual machine (JVM) 204 (FIG. 2). This program is loaded into the main memory 106 when the system is started. The JVM 204 implements a heap object creation function according to this embodiment. Also stored on the hard disk drive 108 is bytecode 206 of an application program (FIG. 2).

The keyboard 110 and the mouse 112 are used to operate graphic objects displayed on the display 114, such as icons, task bars, and windows, in accordance with a graphic user interface provided by the operating system 202.

The display 114 is preferably, but not limited to, a 32-bit true color LCD monitor with a resolution of 1024×768 or more. The display 114 is used to display the behavior of the application program as necessary.

The communication interface 116 is preferably connected to a network in accordance with an Ethernet® protocol. Using a function provided by Apache, the communication interface 116 receives a processing request from a client computer (not shown) in accordance with a communication protocol, such as TCP/IP, or returns a processing result to a client computer (not shown).

FIG. 2 is a diagram showing the layers of software. In FIG. 2, the lowest layer is the operating system 202.

The JVM 204 suitable for the operating system 202 runs thereon. The operating system 202 reserves a stack area and a heap area in the main memory 106 when started. A stack frame is stacked in the stack area each time the application calls a function; the stack frame is deleted therefrom when the function is returned.

The bytecode of the application 206 runs on the JVM 204. When the bytecode 206 is running, the JVM 204 monitors the system status, performs stack size compression or work stealing, and performs an escape analysis in accordance with a predetermined standard. If a specific condition is met, the JVM 204 allocates a task object to the stack.

A feature of the present invention is the function of providing a determination routine criterion by which whether to allocate a task object to the stack is determined on the basis of the result of an escape analysis. In this embodiment, the JVM 204 contains such a determination routine.

Before describing the determination routine criterion for an escape analysis according to this embodiment of the present invention, the behavior of a Fork-Join framework according to the related art will be described. The embodiment of the present invention shows a particularly large advantage when it is applied to, but not limited to, application programs for scientific and technological calculations.

Here assume that a parallel execution program implementing work stealing is executed as described below. This is an example of a Fibonacci sequence calculation Fib( ).

```
class Fib extends ForkJoinTask {
    Integer r;
    Fib(int r) { this.r = r; }
    protected boolean exec( ) {
        if (r < 2) return true;
        Fib f1 = new Fib(r - 1);
        Fib f2 = new Fib(r - 2);
        f1.fork( ); f2.fork( );
        f2.join( ); f1.join( );
        r = f1.r + f2.r;
        return true;
    }
}
void main( ) {
    pool.invoke(new Fib(5));
}
```

Figure 3:
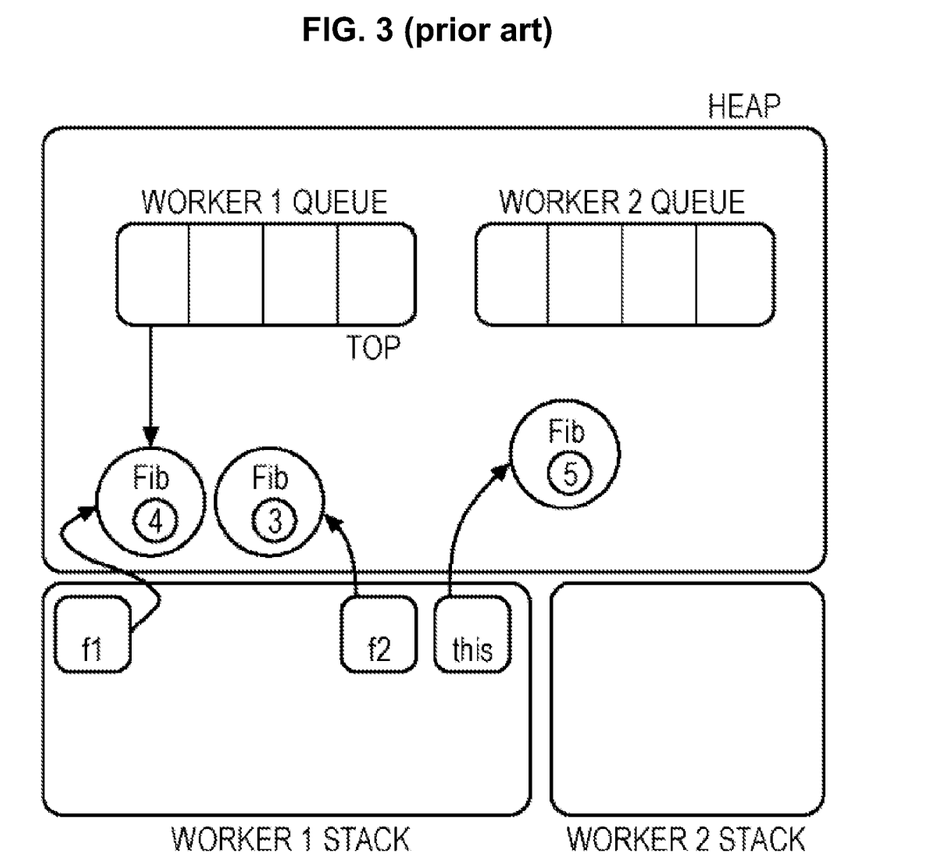
FIG. 3 is a diagram showing a related-art aspect where a worker forks a task and inserts it into the queue of the worker.

FIG. 3 is a diagram showing an aspect where when a worker forks a task using f1.fork( ) in code and inserts the task into its queue. Specifically, first, the main thread inserts Fib (5) into a global queue. A worker 1 then obtains Fib(5) from the global queue. The worker 1 then perform exec( ) of Fib(5) and inserts task Fib(4) into its queue.

Figure 4:
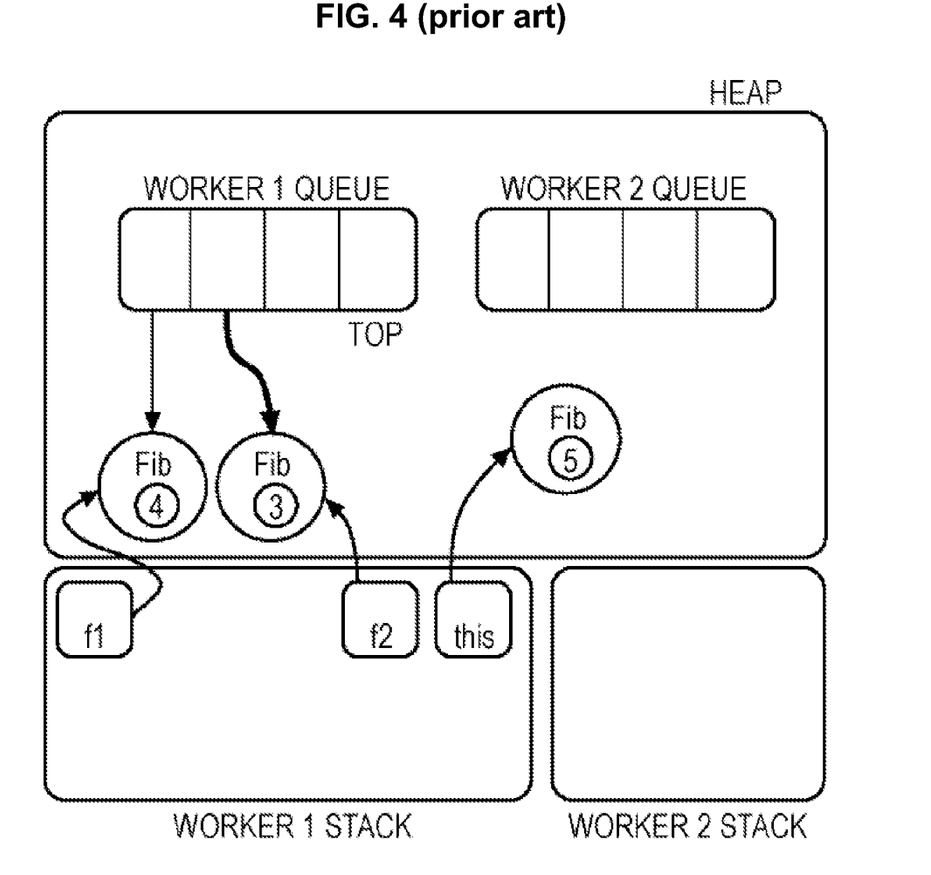
FIG. 4 is a diagram showing a related-art aspect where the worker forks a new task and inserts it into a place next to the previous task in the queue.

FIG. 4 is a diagram showing an aspect where the worker forks a new task using f2.fork( ) in code and inserts the new task into a place next to the previous task in the queue. Specifically, the worker 1 performs exec( ) of Fib(5) and inserts task Fib(3) into its queue. Fib(3) is placed next to Fib(4).

Figure 5:
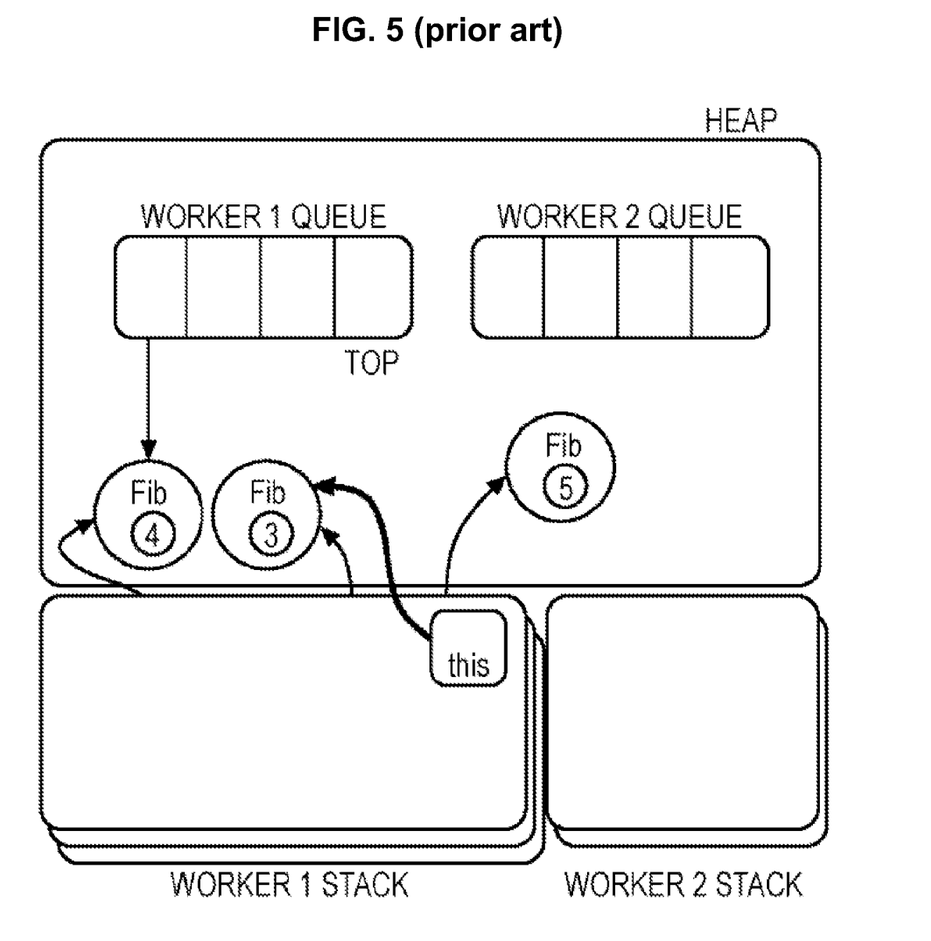
FIG. 5 is a diagram showing a related-art aspect where the worker calls join of the most recently inserted task and performs exec of the task if the task remains in the queue.

FIG. 5 is a diagram showing an aspect where a worker calls join of the most recently inserted task using f2.join( ) and performs exec of the task if the task remains in the queue. Specifically, the worker 1 performs join( ) of Fib(3) and waits for task Fib(3) to complete. Since Fib(3) remains in its own queue, the worker 1 extracts Fib(3) from the queue and performs exec( ) thereof.

Figure 6:
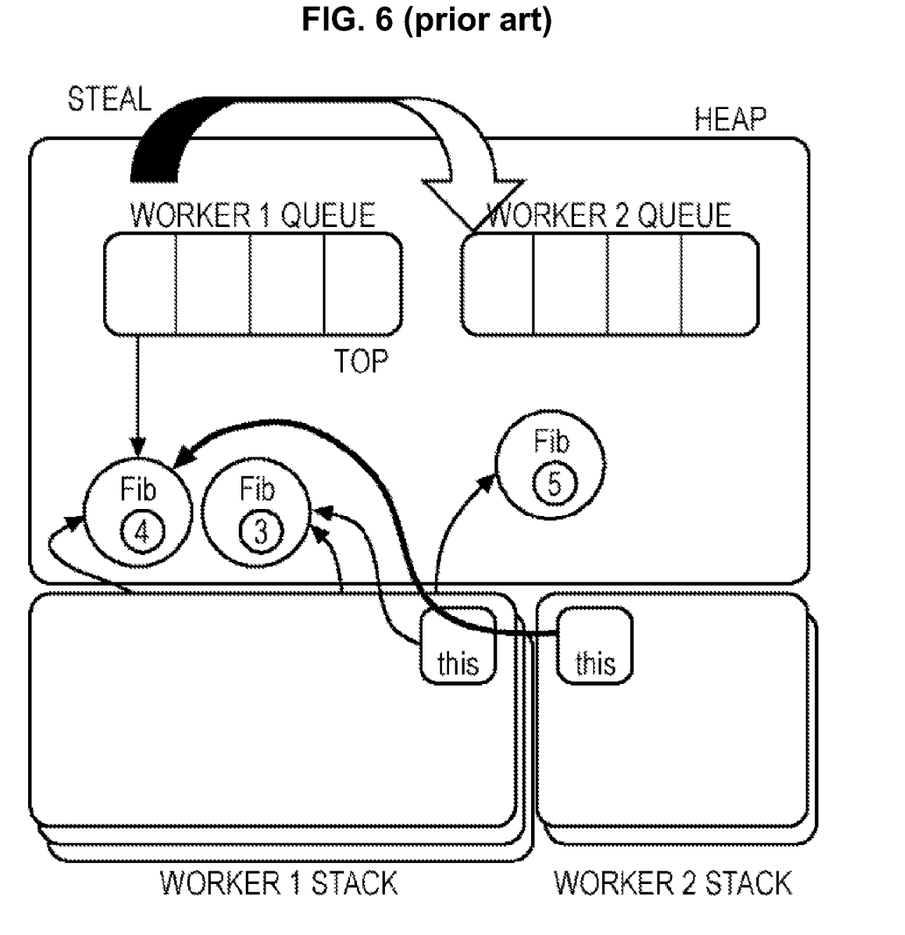
FIG. 6 is a diagram showing a related-art aspect where another worker which has become idle steals a task from the worker having tasks queued therein.

FIG. 6 is a diagram showing an aspect where when another worker becomes idle, it steals a task from the previous worker having the tasks queued therein. Specifically, an idle worker 2 steals Fib(4) from the queue of the worker 1 and performs exec( ) thereof.

Figure 7:
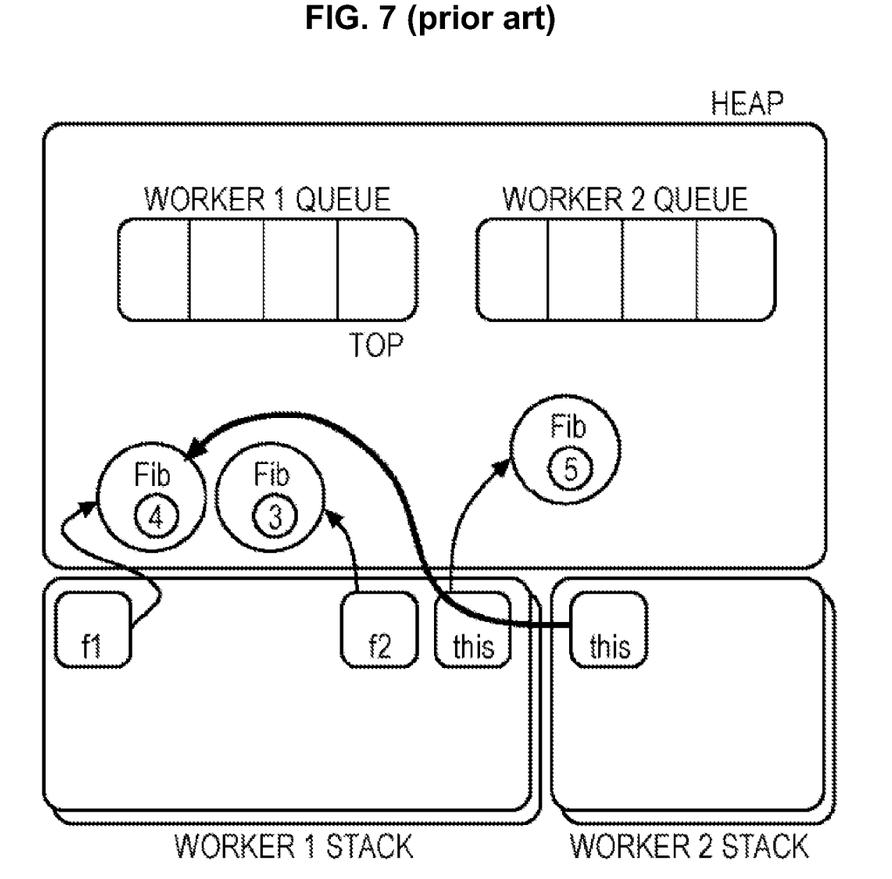
FIG. 7 is a diagram showing a related-art aspect where if a task is not present in the queue of the worker which has called join of the task, the worker waits for the completion of the task.

FIG. 7 is a diagram showing an aspect where if a task is not present in the queue of a worker which has called join of the task, the worker waits for the task to complete. Specifically, the worker 1 calls join( ) of Fib(4) stolen by the worker 2, that is, f1.join( ) and waits for the worker 2 to complete exec( ) of Fib(4).

From such behavior of the Fork-Join framework according to the related art, the embodiments of the present invention includes the following:

(i) At the point in time when join( ) completes, the task has already been deleted.

(ii) At the point in time when join( ) completes, the stealing worker may not be referring to the task. Here, "this" is not escaping in exec( ).

For this reason, any escape in fork( ) and join( ) is ignored, and whether "this" is escaping in exec( ) is determined in an escape analysis.

If the following conditions are met, it can be said that no other threads are referring to the task object at the point in time when join( ) to the task object completes:

(i) Fork( ) and join( ) methods have been called in the method frame which has created the task object.

(ii) In the method frame, the task object is not escaping except for fork( ) and join( ).

(iii) In the exec( ) method of the task object, "this" is not escaping to any other threads.

If these conditions are met, the JVM 204 according to an embodiment of the present invention determines that the task object is not escaping and allocates it to the stack.

Referring now to the flowchart of FIG. 8, the process in which the JVM 204 allocates the task object to the stack or heap on the basis of the result of the escape analysis will be described.

Figure 8:
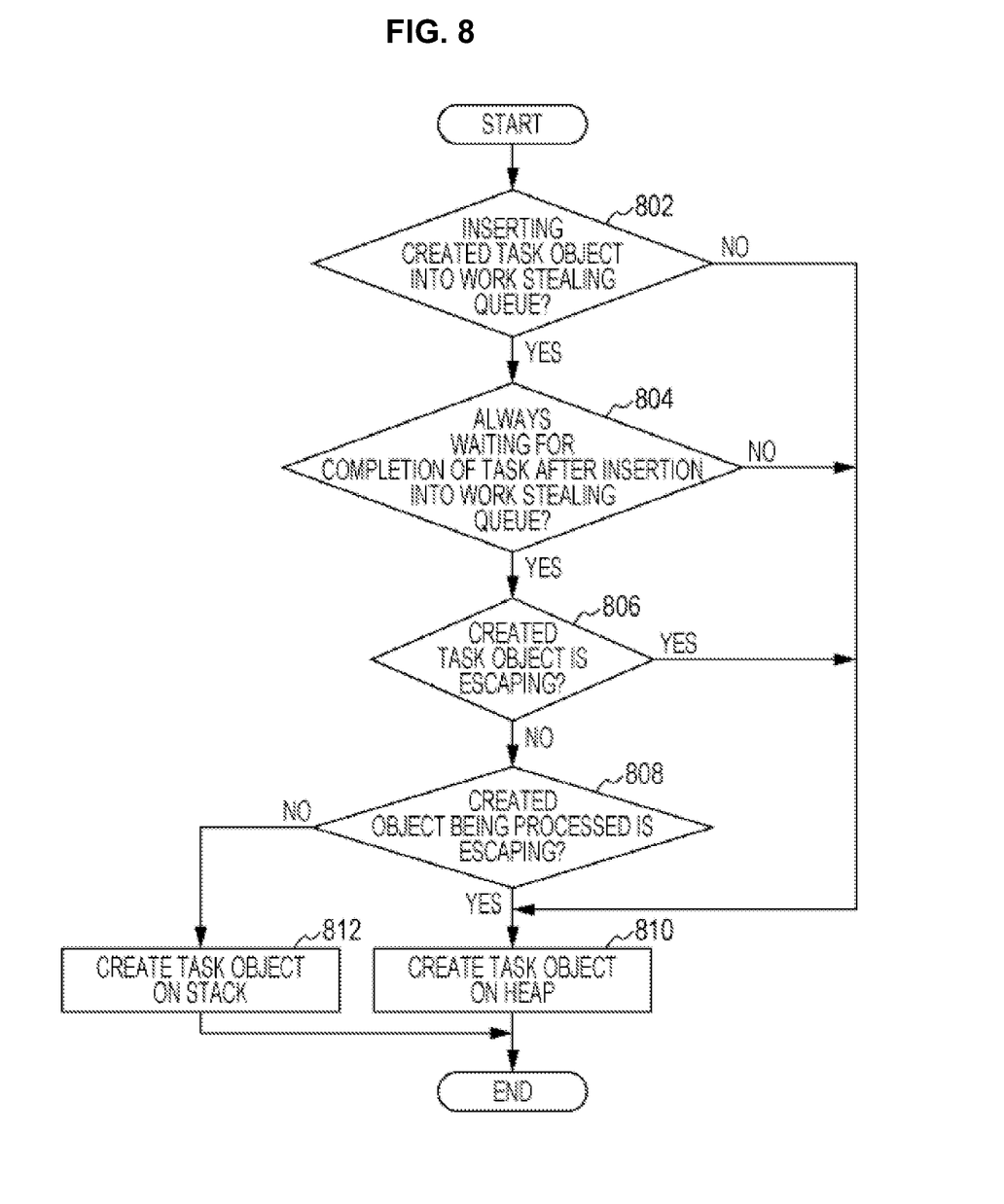
FIG. 8 is a flowchart showing the process of allocating a task object to the stack or heap on the basis of the result of an escape analysis according to an embodiment of the present invention.

In step 802 of FIG. 8, the JVM 204 determines whether the created task object is being inserted in a work-stealing queue. If not so, the JVM 204 proceeds to step 810 and generates the task on the heap.

If the JVM 204 determines in step 802 that the created task object is being inserted in the work-stealing queue, it proceeds to step 804 and determine whether the completion of the task is always being waited for after the insertion of the task object into the work-stealing queue. If not so, the JVM 204 proceeds to step 810 and generates the task on the heap.

If the JVM 204 determines in step 804 that the completion of the task is always being waited for after the insertion of the task into the work-stealing queue, it proceeds to step 806 and determines whether the created task object is escaping, in addition to the determinations as to insertion into the work-stealing queue and waiting for the task to complete. If so, the JVM 204 proceeds to step 810 and generates the task on the heap.

If the JVM 204 determines in step 806 that the created task object is not escaping in addition to the determinations as to insertion to the work-stealing queue and waiting for the task to complete, it proceeds to step 808 and determines whether the task object being processed is escaping. If so, the JVM 204 proceeds to step 810 to create the task on the heap; if not so, it proceeds to step 812 to generate the task on the stack.

Referring now to the flowchart of FIG. 9, an example of the behavior that the JVM 204 performs when executing a method for extracting the task object from the work-stealing queue according to the present invention will be described.

Specifically, in step 902, the JVM 204 determines whether the method to be executed is a method used only when inserting a created task object into the work-stealing queue. If not so, the JVM 204 proceeds to step 906. If the extracted task object is placed on the stack, it moves it to the heap.

If the JVM 204 determines in step 902 that the method to be executed is a method used only when inserting a created task object into the work-stealing queue, it proceeds to step 904. It inserts the task object into the work-stealing queue and then determines whether the method is a method used only when waiting for the task to complete. If not so, the JVM 204 proceeds to step 906. If the extracted task object is placed on the stack, it moves it to the heap. If so in step 904, the JVM 204 does nothing in step 908.

Figure 10:
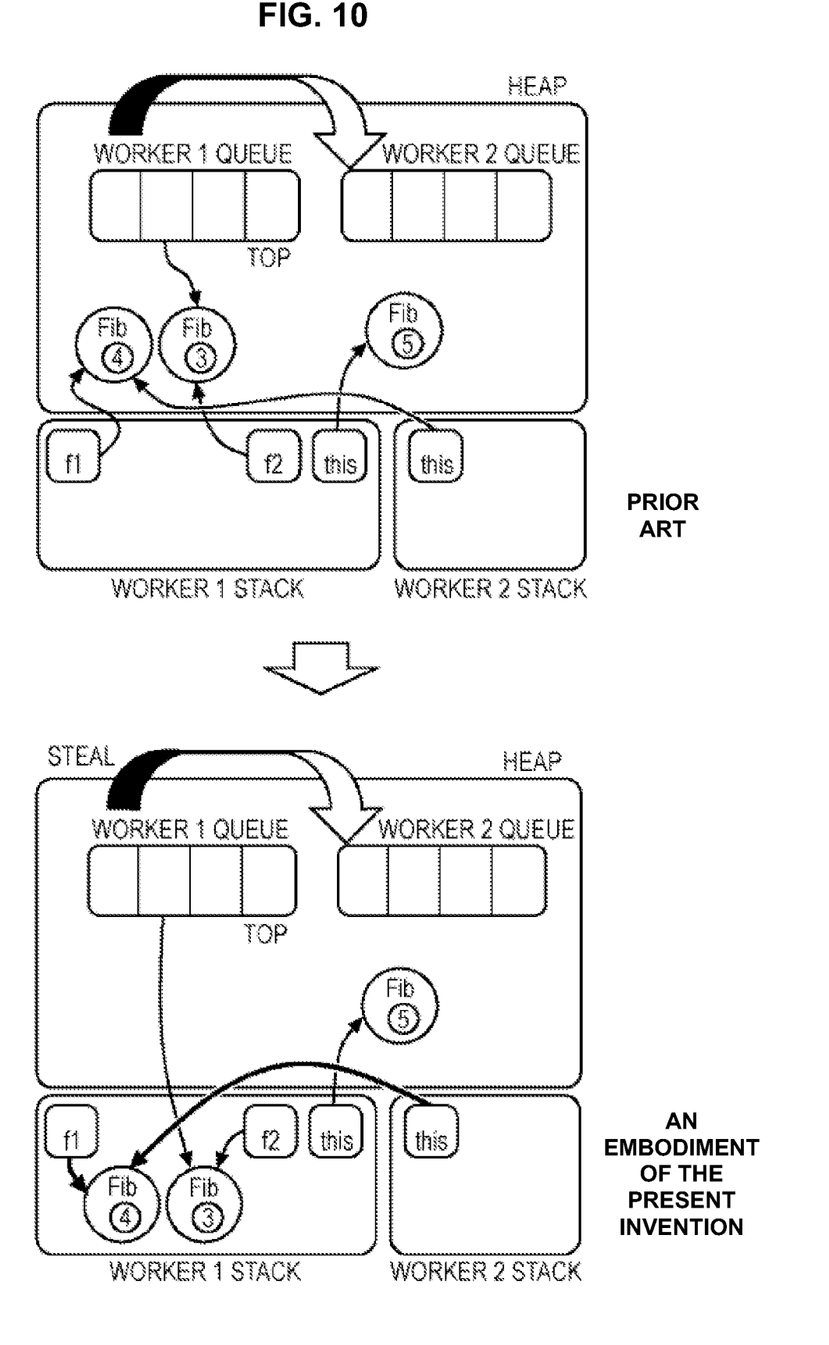
FIG. 10 is a diagram showing the difference in task object handling between the related art and an embodiment of the present invention.

FIG. 10 is a diagram showing an application of an embodiment of the present invention to the related art example shown in FIGS. 3 to 7. Specifically, in this example, Fib(3) and Fib(4) are allocated not to the heap but to the stack on the basis of the result of the escape analysis according to the embodiment of the present invention. In this example, the worker 2 directly touches the object allocated to the stack of the worker 1.

Figure 9:
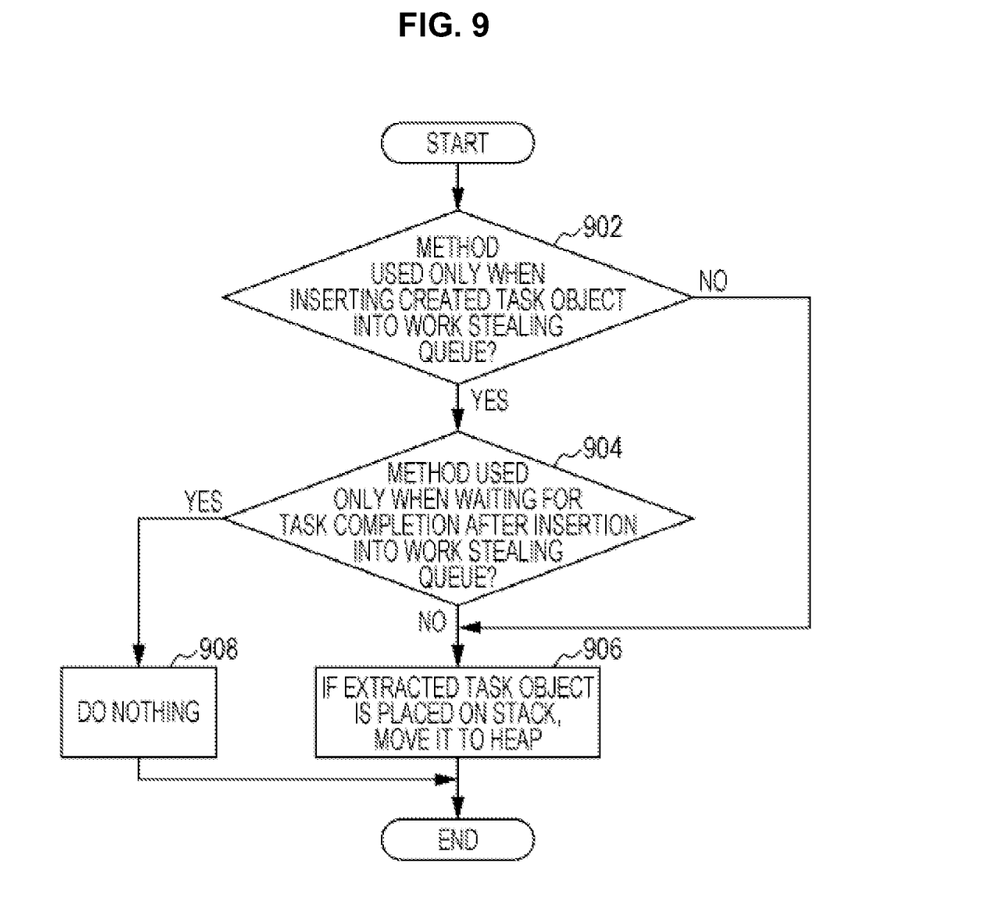
FIG. 9 is a flowchart showing the process of executing a method for extracting a task object from a work-stealing queue according to an embodiment of the present invention.

The embodiments of the present invention may be carried out by generating code for implementing FIGS. 8 and 9 using a JIT compiler rather than a JVM.

Further, an escape analysis and stack allocation based thereon may be performed directly by the operating system rather than a virtual machine environment such as a JVM.

While the embodiments of the present invention have been described using the case where fork( ) and join( ) are called in a Fork-Join framework, the present invention is not limited thereto. More generally, the present invention is applicable to any processing systems which represent tasks as objects, have an instruction for processing a task in the background and an instruction for waiting for the task to complete, and include no reference to the task after executing the task. Examples of such a processing system include, but not limited to, a processing system for parallel distributed programming, X10.

What is claimed is:

1. A computer implemented system for determining whether stack allocation is possible, the system comprising:
    an allocation unit configured to allocate a task object created by a method frame in a first thread to a stack in response to:
    calling a first instruction in the method frame and a second instruction in the method frame,
    wherein:
    the first instruction allows the task object to escape from the first thread to a second thread for parallel processing, the second instruction causes the first thread to complete the task object if the task object has not escaped from the first thread to the second thread, and the second instruction causes the first thread to wait for completion of the task object by the second thread if the task object has escaped from the first thread to the second thread,
    the task object does not escape from the second thread to a third thread during the parallel processing after the task object has escaped from the first thread to a second thread, and
    an instruction, other than the first instruction, that allows the task object to escape from the first thread is not called in the method frame.

2. The system according to claim 1 further comprising a reallocation unit configured to reallocate, to a heap, a task object allocated to a stack when a third instruction is called after the first instruction is called and before the second instruction is called,
    wherein:
    the third instruction is not cancelled by the second instruction and the third instruction can cause an escape of the task object allocated to the stack, and
    the reallocating is performed in response to detecting the third instruction.

3. The system according to claim 2, wherein:
    the method frame invokes on a Fork-Join framework, the first instruction is fork( ) and the second instruction is join( ) as defined in Java Specification Request 166.

4. The system according to claim 2, wherein the third instruction is an instruction other than: (i) a method used only when inserting a task object into a work-stealing queue; and (ii) a method used only when waiting for a task to complete after inserting the task object into the work-stealing queue.

5. The system according to claim 2, wherein a Java virtual machine carries out the steps performed by the allocation and reallocation units.

6. The system according to claim 2, wherein the allocation unit and the reallocation unit each include code generated by a just-in-time compiler.

* * * * *